United States Patent [19]

Kanbara et al.

[11] Patent Number: 5,526,224

[45] Date of Patent: Jun. 11, 1996

[54] ION-CONDUCTIVE POLYMER ELECTROLYTE AND ELECTROLYTIC CAPACITOR USING THE SAME

[75] Inventors: Teruhisa Kanbara, Ikeda; Kenichi Takeyama, Osaka, both of Japan

[73] Assignee: Matsushita Electric Industrial Co., Ltd., Osaka-fu, Japan

[21] Appl. No.: 441,519

[22] Filed: May 15, 1995

[30] Foreign Application Priority Data

May 23, 1994 [JP] Japan .................................. 6-108703

[51] Int. Cl.⁶ .................................................. H01G 9/025
[52] U.S. Cl. ....................... 361/523; 361/524; 252/62.2; 429/192; 429/194; 429/189; 429/198; 429/193
[58] Field of Search .................. 252/62.2; 429/192, 429/198, 189, 193, 194; 361/311, 321.1, 322, 523, 524, 525

[56] References Cited

U.S. PATENT DOCUMENTS

| | | | |
|---|---|---|---|
| 5,071,521 | 12/1991 | Kojima et al. | 205/153 |
| 5,275,750 | 1/1994 | Sato et al. | 252/62.2 |
| 5,356,553 | 10/1994 | Kano et al. | 252/62.2 |
| 5,433,877 | 7/1995 | Kono et al. | 252/62.2 |
| 5,453,335 | 9/1995 | Fauteux et al. | 252/62.2 |

FOREIGN PATENT DOCUMENTS

| | | |
|---|---|---|
| 1-309205 | 12/1989 | Japan . |
| 2-105855 | 4/1990 | Japan . |
| 2-138364 | 5/1990 | Japan . |
| 3-136311 | 6/1991 | Japan . |
| 3-136309 | 6/1991 | Japan . |

*Primary Examiner*—Prince Willis, Jr.
*Assistant Examiner*—Alan D. Diamond
*Attorney, Agent, or Firm*—Panitch Schwarze Jacobs & Nadel

[57] ABSTRACT

A stable ion-conductive polymer electrolyte having a sufficiently high ionic conductivity, which will not be decreased during a long-term storing at a high temperature, and being free from any physical change such as crack, contraction and dissolution, is disclosed. It comprises: at least one polyol selected from the group consisting of an adduct composed of sorbitol and polyethylene oxide and an adduct composed of tetramethylol methane and polyethylene oxide, at least one ammonium salt or morpholinium salt, and at least one organic solvent.

5 Claims, 4 Drawing Sheets

ION-CONDUCTIVE POLYMER ELECTROLYTE AND ELECTROLYTIC CAPACITOR USING THE SAME

BACKGROUND OF THE INVENTION

1. Field of the Invention

The present invention relates to an ion-conductive polymer electrolyte and an aluminum electrolytic capacitor configured with the same electrolyte as an electrolyte for driving the electrolytic capacitor.

2. Description of the Prior Art

Conventionally, as an electrolyte for driving an aluminum electrolytic capacitor, a solution prepared by dissolving an ammonium salt in an organic solvent having a high dielectric constant such as ethylene glycol has been used. However, because of possible leakage and evaporation of the electrolyte, it has been impossible to obtain a long-lasting reliable operation in the capacitor using such liquid electrolyte.

In order to solve these problems, there has been proposed an electrolytic capacitor that is free from the leakage and evaporation of the electrolyte. Such a capacitor is configured by solidifying the capacitor element with the use of an ion-conductive polymer electrolyte composed of a mixture of siloxane-alkylene oxide copolymer and polyethylene oxide, as its prepolymer, and an alkali metal salt, instead of the liquid electrolyte.

However, the electrolytic capacitor using, as its electrolyte, the ion-conductive polymer electrolyte in which alkali metal ions serve as the mobile ions has a disadvantage that the alkali metal ions are liable to diffuse into a dielectric substance layer formed on a positive electrode of the electrolytic capacitor, and the thus diffused alkali metal ions might sometimes cause a lowering of the dielectric constant of the dielectric substance layer, and finally invite a short-circuit in the capacitor.

In order to overcome such disadvantage, it has been considered to use ammonium ions in place of the alkali metal ions which had been used as the mobile ions of the electrolyte constituting the electrolytic capacitor. However, it has hitherto been known that the ion-conductive polymer electrolyte which contains ammonium ions has a very poor ionic conductivity in general.

The ionic conductivity of the electrolyte constituting the electrolytic capacitor acts as an impedance of the capacitor. Therefore, when the ionic conductivity of the electrolyte is too poor, the impedance of the capacitor increases and such a capacitor is difficult to use in practical point of view.

In order to enable an employment of such ion-conductive polymer electrolyte as the electrolyte for driving an electrolytic capacitor, it is essential to clarify a suitable combination of various polymer mother ingredients (prepolymers) with ammonium salts for realizing an electrolyte of high ionic conductivity, but no concrete example has been clarified.

In addition, application of the aluminum electrolytic capacitor has recently been expanded widely, and the importance of its long-term reliability after a storage at a high temperature has been attracting attention. For instance, a guaranteed quality after a continuous exposure to a high temperature of 105° C. for 10,000 hours is now required by the current market. When the polymer electrolytes are exposed to such high temperature atmosphere, physical and/or chemical deterioration such as crack, contraction or dissolution (liquefaction) may be produced, and thus the exposure may cause a serious deterioration in the characteristics of the capacitor element. A solid phase electrolyte which does not suffer from any deteriorated performance due to such severe test environments has not so far been proposed.

SUMMARY OF THE INVENTION

The primary object of the present invention is to provide a stable polymer electrolyte having a sufficiently high ionic conductivity, which will not decrease during a long-term storing at a high temperature, by improving the prepolymer which constitutes the polymer electrolyte.

It is another object of the present invention to provide a stable polymer electrolyte having an excellent storing property, which does not cause any decrease in its ionic conductivity and will not suffer from any physical and/or chemical deterioration such as crack, contraction or dissolution (or liquefaction) when stored at a high temperature for a long period of time.

It is another object of the present invention to provide an electrolytic capacitor having a low impedance and an excellent reliability during storing at a high temperature.

The present invention provides an ion-conductive polymer electrolyte comprising:

at least one polyol selected from the group consisting of an adduct composed of sorbitol and polyethylene oxide and represented by the general formula

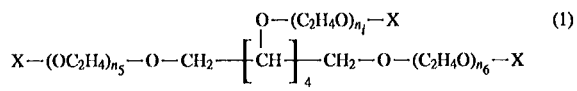 (1)

(wherein each of $n_i$ (i=1,2,3,4), $n_5$ and $n_6$ is an integer of 1 or larger, and X is a group selected from the group consisting of acryloyl, methacryloyl, isocyanate and epoxy) and an adduct composed of tetramethylol methane and polyethylene oxide and represented by the general formula

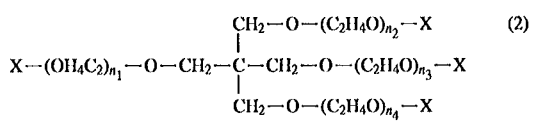 (2)

(wherein each of $n_1$, $n_2$, $n_3$ and $n_4$ is an integer of 1 or larger, and X is a group selected from the group consisting of acryloyl, methacryloyl, isocyanate and epoxy), at least one ammonium salt or morpholinium salt, and at least one organic solvent.

In the above-mentioned ion-conductive polymer electrolyte, it is preferable that each of $n_1$, $n_2$, $n_3$, $n_4$, $n_5$ and $n_6$ in the adducts is 6 or larger and 15 or smaller.

In one embodiment of the present invention, the above-mentioned ion-conductive polymer electrolyte is solidified by forming a cross-linked chain at the terminal group X of the above-mentioned adduct.

An electrolytic capacitor in accordance with the present invention comprises an aluminum positive electrode having a dielectric substance layer composed of aluminum oxide, an aluminum negative electrode, and an ion-conductive polymer electrolyte layer interposed between the above-mentioned dielectric substance layer and the negative electrode.

While novel features of the invention are set forth in the preceding, the invention, both as to organization and content, can be further understood and appreciated, along with other objects and features thereof, from the following

DESCRIPTION OF THE PREFERRED EMBODIMENTS

Figure 1:
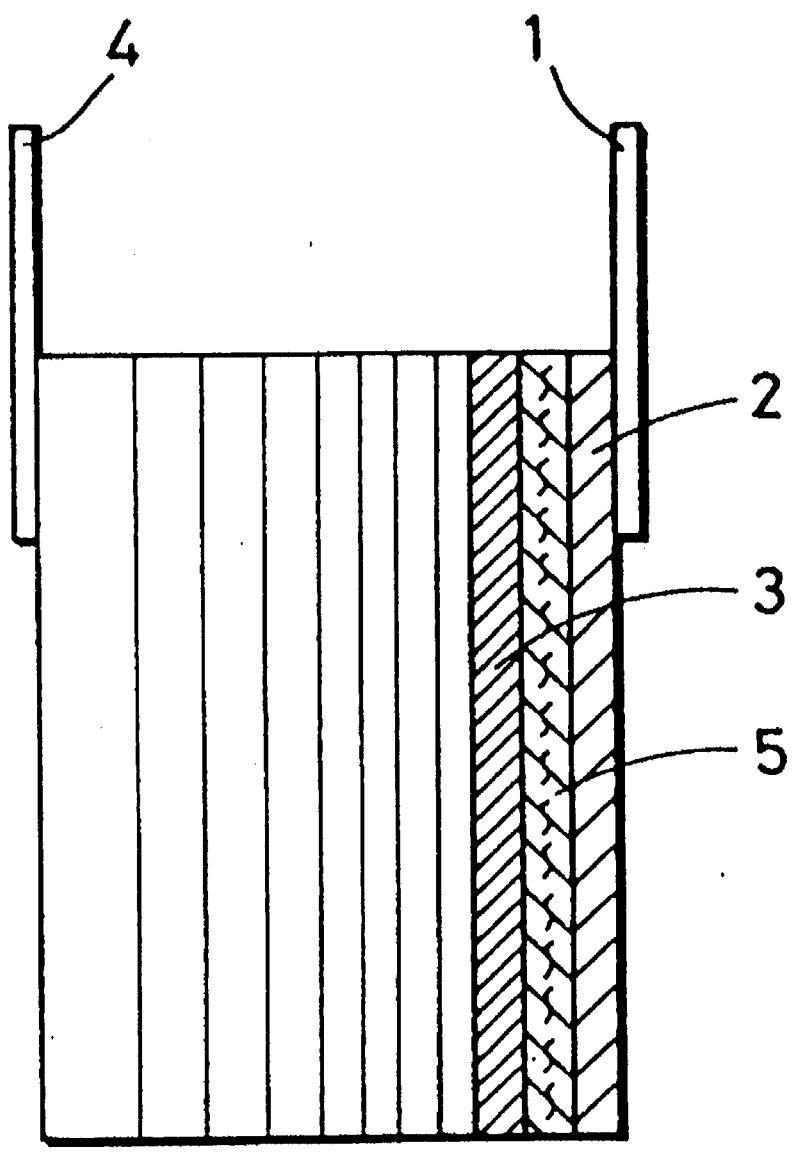
FIG. 1 is a front view of a part cross-section showing an aluminum electrolytic capacitor element in accordance with an embodiment of the present invention.

As has been described previously, in order to enable employment of the above-mentioned ion-conductive polymer electrolyte as an electrolyte particularly for driving an electrolytic capacitor, the electrolyte is required to have a sufficient ionic conductivity which will not decrease during a long-term storing at a high temperature, and further to be free from any physical or chemical deterioration such as crack, contraction and dissolution or liquefaction.

The present inventors have now found that the ion-conductive polymer electrolyte, configured by employing a prepolymer having a structure represented by the above-mentioned general formula (1) or (2) as its polymer mother ingredient and by dissolving an ammonium salt or a morpholinium salt therein, has a particularly excellent characteristic as an electrolyte for driving an electrolytic capacitor.

The ion-conductive polymer electrolyte in accordance with the present invention can improve the physical strength of the electrolyte layer by forming a cross-linked chain at its terminal groups X in the prepolymer. By virtue of this effect, it is possible to configure capacitor elements with the electrolyte layer itself, without employing a separator which has conventionally been considered indispensable for the electrolytic capacitor using a liquid electrolyte, and thus an equivalent series resistance of the capacitor can be reduced greatly.

When the terminal group X of the adduct represented by the general formula (1) or (2) is an acryloyl group or a methacryloyl group, which has a double bond capable of initiating polymerization therein, it is possible to form the cross-linked chain by irradiating the adduct with an active ray such as ultraviolet ray or electron beam, or by heating it.

Further, when the terminal group X of the adduct is an isocyanate group, it is possible to form a cross-linked chain having a urea bond by a reaction with a compound having a hydroxyl group, water, or water component in the air. In forming the urea bond in the isocyanate group, it is convenient to use a maleate salt such as tetramethylammonium maleate and the like.

Moreover, when the terminal group X of the adduct is an epoxy group, it is possible to form a cross-linked chain by allowing the epoxy groups to bind with each other.

Since the adduct represented by the general formula (2) is to be made to have more cross-linking points per volume than the adduct represented by the general formula (1), it can produce a polymer electrolyte having a higher heat-resistant property. The above-mentioned feature is clearly seen in Tables 1 and 5 shown in the subsequent embodiments from the difference in the changes of the conductivity in the samples having a large unit number during storing at a high temperature.

The above-mentioned adduct represented by the general formula (1) or (2) is usually liquid, and by allowing an ammonium salt or a morpholinium salt to dissolve therein, the electrolyte can be prepared, although it is preferable to add an organic solvent which has a sufficient intermiscibility with the above-mentioned compound.

Preferable organic solvents may be exemplified as ethylene glycol, diethylene glycol, triethylene glycol and tetraethylene glycol. By virtue of hydroxyl group (—OH) as their terminal group, these solvents can dissolve a large quantity of ammonium oxalate, ammonium adipate, ammonium azelate, ammonium benzoate, ammonium formate, ammonium citrate, ammonium succinate, ammonium salycilate, ammonium tartarate, ammonium sebacate, ammonium 2-butyloctanedioate, ammonium p-nitrobenzoate, ammonium phthalate, ammonium borodisalycilate, ammonium maleate, ammonium γ-resorcilate, ammonium lactate, ammonium glycolate, or ammonium diphenylacetate, and have a function of dissociating these ammonium salts into ion pairs. By virtue of this effect, it is possible to drastically improve the conductivity of the resultant electrolyte by adding these solvents to the prepolymer. In this description, of the above-mentioned ammonium salts, those of a dibasic acid refer to a mono-hydrogen mono-ammonium salt and a di-ammonium salt.

Another preferred organic solvent may be exemplified as triethyleneglycol monomethylether or tetraethyleneglycol monomethylether. These solvents have a function of dissolving a large quantity of ammonium borodisalycilate, ammonium γ-resocilate or the like and dissociate these ammonium salts into ion pairs. When these solvents are added to the prepolymer, it is possible to improve the conductivity dramatically. In addition, since these solvents have a high boiling point and a low vapor pressure, they give a great reliability to the electrolyte for a long-term storing at a high temperature.

Still other preferred organic solvents may be exemplified as γ-butyrolactone, propylene carbonate, ethylene carbonate, sulfolane, N,N-dimethylformamide, dimethylsulfoxide or acetonitrile. These solvents have a high dielectric constant and a function of dissolving a large quantity of quaternary ammonium salt of benzoic acid, formic acid, salycilic acid, p-nitrobenzoic acid, borodisalycilic acid, γ-resorcilic acid, lactic acid or the like, or a quaternary ammonium salt (including mono hydrogen salt) of a dibasic acid such as oxalic acid, adipic acid, azelaic acid, citric acid, succicinic acid, tartaric acid, sebacic acid, 2-butyloctanedioic acid, phthalic acid, maleic acid or the like, and dissociating these salts into ion pairs. For this reason, when these solvents are added to the prepolymer, it is possible to greatly improve the conductivity of the resultant electrolyte. In this description, the above-mentioned quaternary ammonium salts refer to an alkyl quaternary ammonium salt having from 1 to 4 carbon atoms.

Further, γ-butyrolactone can dissolve N,N-dimethylmorpholinium maleate well.

In accordance with the present invention, it is possible to obtain a polymer electrolyte having a sufficient ionic conductivity which does not decrease during a long-term storing at a high temperature, and is free from any physical and/or chemical deterioration such as crack, contraction or dissolution (or liquefaction). In addition, it is possible to obtain an aluminum electrolytic capacitor having a low impedance and being excellent in heat-resistant storing property.

In the following paragraphs, the present invention will be described in more detail, referring to examples.

EXAMPLE 1

A description will now be made on the ionic conductivity and reliability for storing at a high temperature of the ion-conductive polymer electrolyte prepared by employing a prepolymer, which is an adduct composed of sorbitol and polyethylene oxide and is represented by the general formula (1)

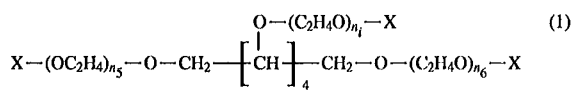

(wherein each of $n_i$ (i=1,2,3,4), $n_5$ and $n_6$ is an integer of 1 or larger, and X is a group selected from the group consisting of acryloyl, methacryloyl, isocyanate and epoxy).

First, a solution was prepared by dissolving 20 g of ammonium 2-butyloctanedioate in 80 g of ethylene glycol. Next, to this solution, added was 20 g of each of the prepolymers of the compounds represented by the formula (1), wherein the terminal group X of the adduct is an acryloyl group and the number n for the ethylene oxide unit included in one branched chain (unit number) of the adduct is adjusted as listed after Sample numbers in Table 1 below, as well as 20 mg of benzyldimethyl ketal as a cross-linking initiator. And the obtained mixture was stirred well to dissolve the additives. Each of the mixtures was spread on a stainless steel tray in a thickness of 0.5 mm and irradiated with ultraviolet rays by a high pressure mercury lamp having an intensity of 100 mJ in a nitrogen atmosphere to obtain an ion-conductive polymer electrolyte sheet.

Ionic conductivities at 30° C. of the electrolyte sheets prepared in the above-mentioned manner were measured by a known complex impedance method. The results of the measurements are summarized in Table 1.

Further, deformations of the electrolytes sealed in glass tubes were also measured and observed after storing them at a high temperature, for evaluating the suitable number of the ethylene oxide unit included in the prepolymer which is practical with respect to the heat-resistant property. The results of the measurements are also summarized in Table 1. Evaluation of the deformations of the electrolytes was performed on the polymer electrolyte sheets finished to have a disk shape with a thickness of 1.0 mm and a diameter of 5 mm, and placed on a bottom of the sealed glass tube having a diameter of 6 mm and a length of 5 cm. The polymer electrolyte sheets sealed in the glass tubes were stored at 125° C., and then the outer shapes of these electrolyte sheets were observed.

TABLE 1

| Sample No. | Unit number | Conductivity (mS/cm) | Changes in outer shape after storing |
|---|---|---|---|
| 1-1 | 1 | not cured | -- |
| 1-2 | 3 | not cured | -- |
| 1-3 | 5 | not cured | -- |
| 1-4 | 6 | 0.5 | no change after 3,000-hour storing |
| 1-5 | 8 | 1.0 | no change after 3,000-hour storing |
| 1-6 | 10 | 1.6 | no change after 3,000-hour storing |
| 1-7 | 12 | 1.7 | no change after 3,000-hour storing |
| 1-8 | 15 | 1.8 | no change after 3,000-hour storing |
| 1-9 | 16 | 2.0 | liquefied after 2,000-hour storing |
| 1-10 | 17 | 2.1 | liquefied after 500-hour storing |
| 1-11 | 20 | 2.2 | liquefied after 50-hour storing |

As clearly shown in Table 1, it is appreciated that if the number of the ethylene oxide unit included in the prepolymer is small, the prepolymer does not have a sufficient intermiscibility with the salt and/or the solvent. It is revealed that only the prepolymer that has been phase-separated is cured, whereas, the salt and the solvent remain in a liquid state, as a result of which it is impossible to produce a homogeneous sheet. It is also appreciated that the larger the number of the ethylene oxide unit is, the higher the ionic conductivity is, and that when the number is large, the electrolyte dissolves or liquefies after a long-term storing at a high temperature.

Thus, it is concluded that among the electrolytes comprising ethylene glycol and ammonium 2-butyloctanedioate, and a prepolymer of an adduct composed of sorbitol and polyethylene oxide, best suitable is the one having the number of the ethylene oxide units included in one branched chain of the adduct in a range from 6 to 15, as an ion-conductive polymer electrolyte which satisfies both the requirements of high conductivity and high heat-resistant property at the same time.

Besides, although the prepolymer having an acryloyl group as the terminal group X was employed in this example, a similar technical advantage can be obtained with the one having a methacryloyl group.

EXAMPLE 2

In this example, availability of other materials than ammonium 2-butyloctanedioate and ethylene glycol which are used as the salt and the solvent, respectively, for configuring the polymer electrolyte in Example 1 is investigated.

As the prepolymer, 50 g of the same prepolymer as used in Sample No. 1-6 in Example 1 was used, and the polymer electrolytes were prepared with this prepolymer together with the salts and solvents listed in Tables 2 and 3 below. The method of preparing the electrolytes was the same as that in Example 1.

Tables 2 and 3 show ionic conductivities of the electrolytes prepared in the above-mentioned manner, measured by means of the known complex impedance method at 30° C. Ionic conductivities of these electrolyte sheets measured after storing in a sealed glass tube in a manner similar to that in Example 1 at 110° C. for 500 hours are also shown in Tables 2 and 3.

In Tables 2 and 3, as well as in the subsequent descriptions on the examples, the following abbreviations are used to indicate the corresponding compounds:

Eg: ethylene glycol
3-Eg: triethylene glycol
GBL: γ-butyrolactone
EC: ethylene carbonate
DIMFA: N,N-dimethylformamide
AN: acetonitrile 2-Eg: diethylene glycol
4-Eg: tetraethylene glycol
PC: propylene carbonate
SL: sulfolane
DIMSO: dimethylsulfoxide

TABLE 2

| Ammonium salt | Amount of addition (g) | Solvent | Amount of addition (g) | Conductivity (mS/cm) Initial | Conductivity (mS/cm) After storing |
|---|---|---|---|---|---|
| Ammonium 2-butyl-octane-dioate | 20 | Eg | 80 | 1.0 | 0.8 |
|  | 20 | 2-Eg | 80 | 0.8 | 0.7 |
|  | 20 | 3-Eg | 80 | 0.5 | 0.5 |
|  | 20 | 4-Eg | 80 | 0.1 | 0.1 |
| Ammonium lactate | 20 | Eg | 80 | 1.0 | 0.9 |
|  | 20 | 2-Eg | 80 | 0.8 | 0.7 |
|  | 20 | 3-Eg | 80 | 0.5 | 0.5 |
|  | 20 | 4-Eg | 80 | 0.1 | 0.1 |
| Ammonium diphenyl acetate | 20 | Eg | 80 | 1.0 | 0.9 |
|  | 20 | 2-Eg | 80 | 0.8 | 0.8 |
|  | 20 | 3-Eg | 80 | 0.5 | 0.5 |
|  | 20 | 4-Eg | 80 | 0.1 | 0.1 |
| Ammonium benozoate | 15 | Eg | 85 | 0.8 | 0.5 |
| Ammonium formate | 10 | Eg | 90 | 3.0 | 1.5 |
| Ammonium hydrogen citrate | 10 | Eg | 90 | 0.7 | 0.4 |
| Ammonium hydrogen succinate | 10 | Eg | 90 | 0.5 | 0.3 |
| Ammonium salycilate | 10 | Eg | 90 | 2.0 | 1.2 |

TABLE 3

| Ammonium salt | Amount of addition (g) | Solvent | Amount of addition (g) | Conductivity (mS/cm) Initial | Conductivity (mS/cm) After storing |
|---|---|---|---|---|---|
| Ammonium tartarate | 10 | Eg | 90 | 0.2 | 0.1 |
| Ammonium hydrogen sebacate | 10 | Eg | 90 | 0.3 | 0.2 |
| Ammonium p-nitro-benzoate | 5 | Eg | 95 | 0.2 | 0.1 |
| Tetramethylammonium hydrogen maleate | 20 | GBL | 80 | 12 | 8.0 |
|  | 20 | PC | 80 | 11 | 8.0 |
|  | 20 | PC + EC | 80 | 10 | 8.5 |
| Tetraethylammonium hydrogen phthalate | 20 | GBL | 80 | 5.0 | 3.0 |
|  | 20 | PC | 80 | 4.0 | 3.2 |
|  | 20 | PC + EC | 80 | 2.0 | 1.5 |
| Tetramethylammonium hydrogen adipate | 20 | GBL | 80 | 5.0 | 4.0 |
| Tetraethylammonium hydrogen adipate | 25 | GBL | 80 | 4.0 | 3.5 |
| Tetrabutylammonium hydrogen adipate | 30 | GBL | 80 | 2.5 | 2.3 |
| Tetraethylammonium hydrogen oxalate | 20 | PC + SL | 80 | 2.0 | 1.7 |
| Tetraethylammonium hydrogen azelate | 20 | PC + DIMFA | 80 | 3.0 | 2.5 |
| Tetraethylammonium borodisalicy-late | 20 | PC + DIMSO | 80 | 3.0 | 2.2 |
| Tetraethylammonium γ-resorcilate | 20 | PC + AN | 80 | 4.0 | 3.2 |
| N,N-dimethyl-morpholinium maleate | 20 | GBL | 80 | 6.0 | 5.8 |

From the results shown in the above tables, it is found that an ion-conductive polymer electrolyte, configured with any of the prepolymers, salts as well as solvents listed in Tables 2 and 3, has a sufficiently high conductivity in practical point of view and is excellent in the high heat-resistant property.

EXAMPLE 3

Different from the polymer electrolytes in Example 1, wherein the prepolymer represented by the general formula (1) whose terminal group X is acryloyl group was used for constituting the polymer electrolytes, other prepolymers whose terminal group X is isocyanate group were used in constituting the polymer electrolytes in this example.

First, a solution was prepared by dissolving 20 g of tetramethylammonium hydrogen maleate in 80 g of γ-butyrolactone. Next, to this solution, added was each 20 g of the prepolymers represented by the formula (1) whose terminal group X is isocyanate group and whose number of ethylene oxide unit n included in one branched chain of the adduct is adjusted as listed after Sample numbers in Table 4 below, and the mixture was stirred well to dissolve the additive.

The mixed solution was then spread on a flat Petri dish made of glass in a thickness of 0.5 mm, and the spread solution was cured by keeping it at 50° C. for 1 hour to obtain an ion-conductive polymer electrolyte sheet.

Ionic conductivities at 30° C. of the electrolyte sheets prepared in the above-mentioned manner were measured by the known complex impedance method. The results are summarized in Table 4.

In addition, deformations of the electrolyte sheets were investigated by sealing them in a glass tube and storing them at 125° C. in a manner similar to that in Example 1, and the results of the investigations are also summarized in Table 4.

TABLE 4

| Sample No. | Unit number | Conductivity (mS/cm) | Changes in outer shape after storing at high temperature |
|---|---|---|---|
| 3-1 | 1 | not cured | -- |
| 3-2 | 3 | not cured | -- |
| 3-3 | 5 | not cured | -- |
| 3-4 | 6 | 6.0 | no change after 3,000-hour storing |
| 3-5 | 8 | 8.0 | no change after 3,000-hour storing |
| 3-6 | 10 | 11 | no change after 3,000-hour storing |
| 3-7 | 12 | 12 | no change after 3,000-hour storing |
| 3-8 | 15 | 14 | no change after 3,000-hour storing |
| 3-9 | 16 | 18 | liquefied after 2,000-hour storing |
| 3-10 | 17 | 20 | liquefied after 500-hour storing |
| 3-11 | 20 | 22 | liquefied after 100-hour storing |

As clearly shown in Table 4, it is appreciated that if the number of ethylene oxide unit included in the prepolymer is small, the prepolymer does not have a sufficient intermiscibility with the salt and/or solvent and the electrolyte cannot be cured homogeneously. It is also appreciated that the larger the number of the ethylene oxide unit is, the higher the ionic conductivity is, and that when the number is large, the electrolyte dissolves or liquefies after a long-term storing at a high temperature.

Thus, it is concluded that among the electrolytes comprising γ-butyrolactone and tetramethylammonium maleate, and a prepolymer of an adduct composed of sorbitol and polyethylene oxide, best suitable is the one having the number of the ethylene oxide units included in one branched chain of the adduct in a range from 6 to 15, as an ion-conductive polymer electrolyte which satisfies both the requirements of high conductivity and high heat-resistant property at the same time.

Besides, although the prepolymer having an isocyanate group as the terminal group X was employed in this example, a similar technical advantage can be obtained with the one having an epoxy group.

EXAMPLE 4

A description will now be made on the ionic conductivity and reliability for storing at a high temperature of the electrolytes prepared by employing prepolymers of the compound, which is an adduct composed of tetramethylol methane and polyethylene oxide and is represented by the general formula (2)

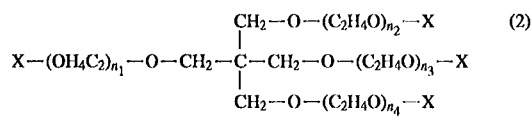

(wherein each of $n_1$, $n_2$, $n_3$ and $n_4$ is an integer of 1 or larger, and X is a group selected from the group consisting of acryloyl, methacryloyl, isocyanate and epoxy).

First, a solution was prepared by dissolving 20 g of ammonium 2-butyloctanedioate in 80 g of ethylene glycol. Next, to this solution, added was each 20 g of the prepolymers of the adducts represented by the formula (2), wherein the number n for the ethylene oxide unit included in one branched chain (unit number) of the adduct is adjusted as listed after Sample numbers in Table 5 below, as well as 20 mg of benzyldimethyl ketal as a cross-linking initiator. And the obtained mixture was stirred well to dissolve the additives. Each of the mixtures was spread on a stainless steel tray in a thickness of 0.5 mm and irradiated with ultraviolet rays by a high pressure mercury lamp having an intensity of 100 mJ in a nitrogen atmosphere to obtain an ion-conductive polymer electrolyte sheet.

Ionic conductivities at 30° C. of the electrolyte sheets prepared in the above-mentioned manner were measured by the known complex impedance method. The results of the measurements are summarized in Table 5.

Further, deformations in the outer shape of the electrolytes sealed in glass tubes were also investigated after storing them at 125° C. in a manner similar to that in Example 1. The results of the measurements are also summarized in Table 5.

TABLE 5

| Sample No. | Unit number | Conductivity (mS/cm) | Changes in outer shape after storing at high temperature |
|---|---|---|---|
| 4-1 | 1 | not cured | -- |
| 4-2 | 3 | not cured | -- |
| 4-3 | 5 | not cured | -- |
| 4-4 | 6 | 0.3 | no change after 3000-hour storing |
| 4-5 | 10 | 1.0 | no change after 3,000-hour storing |
| 4-6 | 15 | 1.5 | no change after 3,000-hour storing |
| 4-7 | 16 | 1.7 | no change after 3,000-hour storing |
| 4-8 | 17 | 1.8 | liquefied after 1,000-hour storing |
| 4-9 | 20 | 2.0 | liquefied after 200-hour storing |

As clearly shown in Table 5, it is appreciated that if the number of the ethylene oxide unit included in the prepolymer is small, the prepolymer does not have a sufficient intermiscibility with the salt and/or the solvent. It is revealed that only the prepolymer that has been phase-separated is cured, whereas, the salt and the solvent remain in a liquid state, as a result of which it is impossible to produce a homogeneous sheet. It is also appreciated that the larger the number of the ethylene oxide unit is, the higher the ionic conductivity is, and that when the number is large, the electrolyte dissolves or liquefies after a long-term storing at a high temperature.

Thus, it is concluded that among the electrolytes comprising ethylene glycol and ammonium 2-butyloctanedioate, and a prepolymer of an adduct composed of tetramethylol methane and polyethylene oxide, best suitable is the one having the number of the ethylene oxide units included in one branched chain of the adduct in a range from 6 to 15, as an ion-conductive polymer electrolyte which satisfies both the requirements of high conductivity and high heat-resistant property at the same time.

Besides, although the prepolymer having an acryloyl group as the terminal group X was employed in this example, a similar technical advantage is obtained with the one having a methacryloyl group.

EXAMPLE 5

In this example, availability of other materials than ammonium 2-butyloctanedioate and ethylene glycol which are used as the salt and solvent, respectively, for configuring the polymer electrolyte in Example 4 is investigated.

As the prepolymer, 50 g of the same prepolymer as used in Sample No. 4–6 in Example 4 was used, and the polymer electrolytes were prepared with this prepolymer together with the salts and solvents listed in Table 6 below. The method of preparing the electrolyte was the same as that in Example 4.

Table 6 shows ionic conductivities of the electrolytes prepared in the above-mentioned manner, measured by means of the known complex impedance method at 30° C. Ionic conductivities of these electrolyte sheets measured after storing in a sealed glass tube in a manner similar to that in Example 1 at 125° C. for 500 hours are also shown in Table 6.

TABLE 6

| Ammonium salt | Amount of addition (g) | Solvent | Amount of addition (g) | Conductivity (mS/cm) Initial | After storing |
| --- | --- | --- | --- | --- | --- |
| Ammonium 2-butyl-octanedioate | 20 20 | Eg 4-Eg | 80 80 | 1.0 0.2 | 0.5 0.15 |
| Ammonium lactate | 20 20 | Eg 4-Eg | 80 80 | 1.5 0.3 | 0.8 0.25 |
| Ammonium diphenyl acetate | 20 20 | Eg 4-Eg | 80 80 | 1.0 0.2 | 0.9 0.18 |
| Ammonium glycolate | 20 | Eg | 80 | 2.0 | 1.2 |
| Ammonium salycilate | 10 | Eg | 90 | 2.0 | 1.2 |
| Tetramethyl-ammonium hydrogen maleate | 20 | GBL | 80 | 12 | 8.0 |
| Trimethyl-monoethyl-ammonium hydrogen maleate | 20 | GBL | 80 | 12 | 8.0 |
| Tetramethyl-ammonium hydrogen adipate | 20 | GBL | 80 | 5.0 | 4.0 |
| Tetraethyl-ammonium hydrogen azelate | 20 | PC + DIMFA | 80 | 3.0 | 2.5 |
| Tetraethyl-ammonium borodisaly-cilate | 20 | PC + DIMSO | 80 | 3.0 | 2.2 |
| Tetraethyl-ammonium γ-resorcilate | 20 | PC + AN | 80 | 4.0 | 3.2 |
| N,N-di-methyl-morpholinium maleate | 20 | GBL | 80 | 6.0 | 5.8 |

From the results shown in the above table, it is found that an ion-conductive polymer electrolyte, configured with any of the prepolymers, salts as well as solvents listed in Table 6, has a sufficiently high conductivity in practical point of view and is excellent in the high heat-resistant property.

EXAMPLE 6

Different from the polymer electrolytes in Example 4, wherein the prepolymer represented by the general formula (2) whose terminal group X is acryloyl group is used for constituting the polymer electrolytes, other prepolymers whose terminal group X is isocyanate group were used in constituting the polymer electrolytes in this example.

First, a solution was prepared by dissolving 20 g of tetramethylammonium hydrogen maleate in 80 g of γ-butyrolactone. Next, to this solution, added was each 20 g of the prepolymers represented by the formula (2) whose terminal group X is isocyanate group and whose number of ethylene oxide unit n included in one branched chain of the adduct is adjusted as listed after Sample numbers in Table 7 below, and the mixture was stirred well to dissolve the additive.

The mixed solution was then spread on a flat Petri dish made of glass in a thickness of 0.5 mm and the spread solution was cured by keeping it in air at 50° C. for 1 hour to obtain an ion-conductive polymer electrolyte sheet.

Ionic conductivities at 30° C. of the electrolyte sheets prepared in the above-mentioned manner were measured by the known complex impedance method. The results are summarized in Table 7.

In addition, deformations of the electrolyte sheets were observed by sealing them in a glass tube and storing them at 125° C. in a manner similar to that in Example 1. The results of the investigations are also summarized in Table 7.

TABLE 7

| Sample No. | Unit number | Conductivity (mS/cm) | Changes in outer shape after storing at high temperature |
| --- | --- | --- | --- |
| 6–1 | 1 | not cured | — |
| 6–2 | 3 | not cured | — |
| 6–3 | 5 | not cured | — |
| 6–4 | 6 | 6.0 | no change after 2,000-hour storing |
| 6–5 | 8 | 8.0 | no change after 2,000-hour storing |
| 6–6 | 10 | 11 | no change after 2,000-hour storing |
| 6–7 | 12 | 12 | no change after 2,000-storing |
| 6–8 | 15 | 14 | no change after 2,000-hour storing |
| 6–9 | 16 | 18 | liquefied after 2,000-hour storing |
| 6–10 | 17 | 20 | liquefied after 500-hour storing |
| 6–11 | 20 | 22 | liquefied after 100-hour storing |

As clearly shown in Table 7, it is appreciated that if the number of ethylene oxide unit included in the prepolymer is small, the prepolymer does not have a sufficient intermiscibility with the salt and/or solvent and the electrolyte cannot be cured homogeneously. It is also appreciated that the larger the number of the ethylene oxide unit is, the higher the ionic conductivity is, and that when the number is large, the electrolyte dissolves or liquefies after a long-term storing at a high temperature.

Thus, it is concluded that among the electrolytes comprising γ-butyrolactone and tetramethylammonium maleate, and a prepolymer of an adduct composed of tetramethylol methane and polyethylene oxide, best suitable is the one having the number of the ethylene oxide units included in one branched chain of the adduct in a range from 6 to 15, as an ion-conductive polymer electrolyte which satisfies both the requirements of high conductivity and high heat-resistant property at the same time.

Besides, although the prepolymer having an isocyanate group as the terminal group X was employed in this example, a similar technical advantage can be obtained with the one having an epoxy group.

EXAMPLE 7

In this example, a description will be made on the concrete embodiment of the aluminum electrolytic capacitor configured with the ion-conductive polymer electrolytes shown in the precedent examples as its driving electrolyte.

FIG. 1 shows a configuration of the aluminum electrolytic capacitor. On an electrode made of an aluminum foil of 3 cm×100 cm in size and 0.05 mm in thickness, with a multiplicity of etched pores each having a diameter ranging from about 1 to 5 microns, a positive electrode (anode) connector 1 was spot-welded. Next, the aluminum foil was anodized by soaking it in an aqueous solution of boric acid/sodium borate (80 g of boric acid+8 g of sodium borate/1000 ml of water) kept at 90° C. and by flowing a current of 30 A for 15 minutes and then applying a voltage of 600 V for 5 hours, to obtain a positive electrode foil 2.

Further, a negative electrode 3 was prepared by spot-welding a negative electrode connector 4 on an electrode 3 made of an aluminum foil of 3 cm×100 cm in size and 0.05 mm in thickness, with a multiplicity of etched pores each having a diameter ranging from about 1 to 5 microns.

Next, a base liquid for the polymer electrolyte was prepared. That is, the liquid was prepared by adding 50 g of the prepolymer identical with that of Sample No. 1–6 in Example 1 and 500 mg of benzyldimethyl ketal to a solution composed of 80 g of ethylene glycol and 20 g of ammonium 2-butyloctanedioate, and by stirring the whole to make the composition sufficiently homogeneous.

Subsequently, the base liquid composition for the polymer electrolyte was coated on the positive electrode foil 2 in a thickness of 0.1 mm, which was then irradiated with ultra-violet rays at an intensity of 100 mJ by means of a high pressure mercury lamp to cure the coated base liquid for the polymer electrolyte, thereby to form an ion-conductive polymer electrolyte layer 5.

Next, the negative aluminum electrode 3 was pressed on the other surface of the above-mentioned electrolyte layer 5. Finally, an aluminum electrolytic capacitor A which employed the ion-conductive polymer electrolyte was produced by rolling-up the laminated positive electrode foil 2, electrolyte layer 5 and negative electrode foil 3 together in a spiral arrangement.

As a comparative example, non-sealed aluminum electrolytic capacitor B similar to capacitor A was prepared using the known electrolyte prepared by dissolving 20 g of ammonium 2-butyloctanedioate in 80 g of ethylene glycol in the following manner. That is, the same positive electrode foil and negative electrode foil as those used for preparing the aluminum electrolytic capacitor element A were rolled-up together with a separator of 3 cm×4 cm made of Manila hemp having a void ratio of 50% and a thickness of 0.1 mm in a spiral arrangement, and then the rolled-up assembly was impregnated under reduced pressure with the electrolyte at a pressure of 5 Torr at room temperature for one minute to obtain the capacitor element B.

An aging process was performed by applying a voltage of 450 V at 80° C. for two hours for element A, and by applying a voltage of 450 V at room temperature for 24 hours for element B, respectively.

Figure 2:
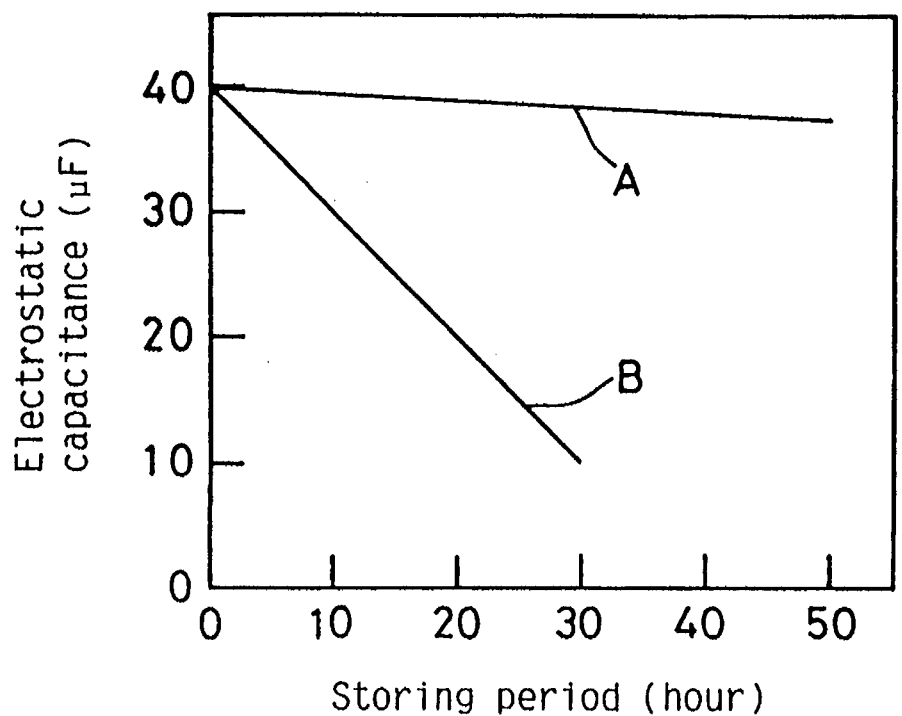
FIG. 2 is a diagram showing changes in the electrostatic capacitance of the capacitor elements of the embodiment and of a comparative example during storing.
Figure 3:
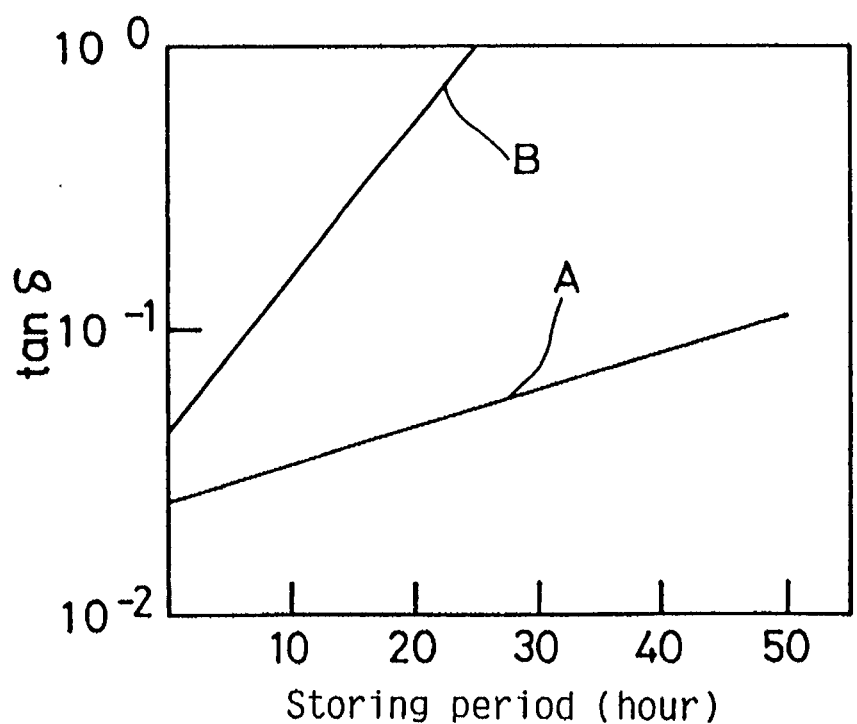
FIG. 3 is a diagram showing changes in the tan δ of the capacitor elements of the embodiment and of a comparative example during storing.

As an accelerated test for evaluating the stability of the electrolytes in the aluminum electrolytic capacitor element A of this example and the capacitor element B of the comparative example during their storing at a high temperature, measurements on the electrostatic capacitance, and tanδ (loss angle), as well as their changes by aging after storing at 105° C. in a non-sealed condition were performed. The results thereof are shown in FIG. 2 and FIG. 3, respectively. The above measurements were performed at 30° C. at 120 Hz.

As clearly shown in these figures, it is appreciated that the characteristics of capacitor element B of the comparative example configured with the known electrolyte employing ethylene glycol as its solvent deteriorate at early stage of the test after storing at a high temperature, whereas the capacitor element A configured with the electrolyte of the present invention has a sufficient reliability in its stability.

Besides, although the prepolymer having a skeletal structure of sorbitol was employed in this example, a similar technical advantage can be obtained with the one having a skeletal structure of tetramethylol methane as employed in Examples 4, 5 and 6.

EXAMPLE 8

Different from the polymer electrolyte of Example 7 which employs ammonium 2-butyloctanedioate and ethylene glycol as the salt and the solvent, respectively, availability of other materials is investigated in this example. The manner of producing the elements was identical with that of Example 7, and the compositions of the ion-conductive polymer electrolytes are shown in Tables 8 and 9 below. Further, the aging voltages selected are 400 V for the polymer electrolytes employing ethylene glycol as the solvent, and 50 V for those employing the other solvents.

Initial values of tanδ of these elements and the tanδ values of these elements after stored in the non-sealed condition at 110° C. for 24 hours are summarized in Tables 8 and 9.

TABLE 8

| Ammonium salt | Amount of addition (g) | Solvent | Amount of addition (g) | Tanδ (%) Initial | Tanδ (%) After storing |
|---|---|---|---|---|---|
| Ammonium 2-butyl-octanedioate | 20 | 4-Eg | 80 | 10 | 15 |
| Ammonium lactate | 20 | Eg | 80 | 3.0 | 5.0 |
| | 20 | 4-Eg | 80 | 8.0 | 12 |
| Ammonium diphenyl acetate | 20 | Eg | 80 | 4.0 | 7.0 |
| | 20 | 4-Eg | 80 | 12 | 15 |
| Ammonium benzoate | 15 | Eg | 85 | 5.0 | 8.5 |
| Ammonium formate | 10 | Eg | 90 | 1.5 | 3.2 |
| Ammonium hydrogen citrate | 10 | Eg | 90 | 5.5 | 8.2 |
| Ammonium hydrogen succinate | 10 | Eg | 90 | 6.2 | 9.0 |
| Ammonium salycilate | 10 | Eg | 90 | 11 | 18 |

TABLE 9

| Ammonium salt | Amount of addition (g) | Solvent | Amount of addition (g) | Tanδ (%) Initial | Tanδ (%) After storing |
|---|---|---|---|---|---|
| Ammonium hydrogen tartarate | 10 | Eg | 90 | 12 | 20 |
| Ammonium | 10 | Eg | 90 | 12 | 18 |

TABLE 9-continued

| Ammonium salt | Amount of addition (g) | Solvent | Amount of addition (g) | Tanδ (%) Initial | Tanδ (%) After storing |
|---|---|---|---|---|---|
| hydrogen sebacate | | | | | |
| Ammonium p-nitro-benzoate | 5 | Eg | 95 | 15 | 18 |
| Tetramethyl-ammonium hydrogen maleate | 20 | GBL | 80 | 0.5 | 0.8 |
| Tetraethyl-ammonium hydrogen phthalate | 20 | GBL | 80 | 0.8 | 1.2 |
| Tetramethyl-ammonium hydrogen adipate | 20 | GBL | 80 | 1.0 | 1.4 |
| Tetrabutyl-ammonium hydrogen adipate | 30 | GBL | 80 | 1.2 | 1.4 |
| Tetraethyl-ammonium hydrogen oxalate | 20 | PC + SL | 80 | 1.0 | 1.2 |
| Tetraethyl-ammonium hydrogen azelate | 20 | PC + DIMFA | 80 | 0.9 | 1.3 |
| Tetraethyl-ammonium borodi-salycilate | 20 | PC + DIMSO | 80 | 1.0 | 1.3 |
| Tetraethyl-ammonium γ-resorcilate | 20 | PC + AN | 80 | 0.9 | 1.3 |
| N,N-di-methyl-morpholinium maleate | 20 | GBL | 80 | 0.7 | 0.9 |

EXAMPLE 9

In this example, a description will be made on a concrete embodiment of an aluminum electrolytic capacitor configured with an ion-conductive polymer electrolyte prepared by using one of the prepolymers disclosed in Example 6.

Figure 4:
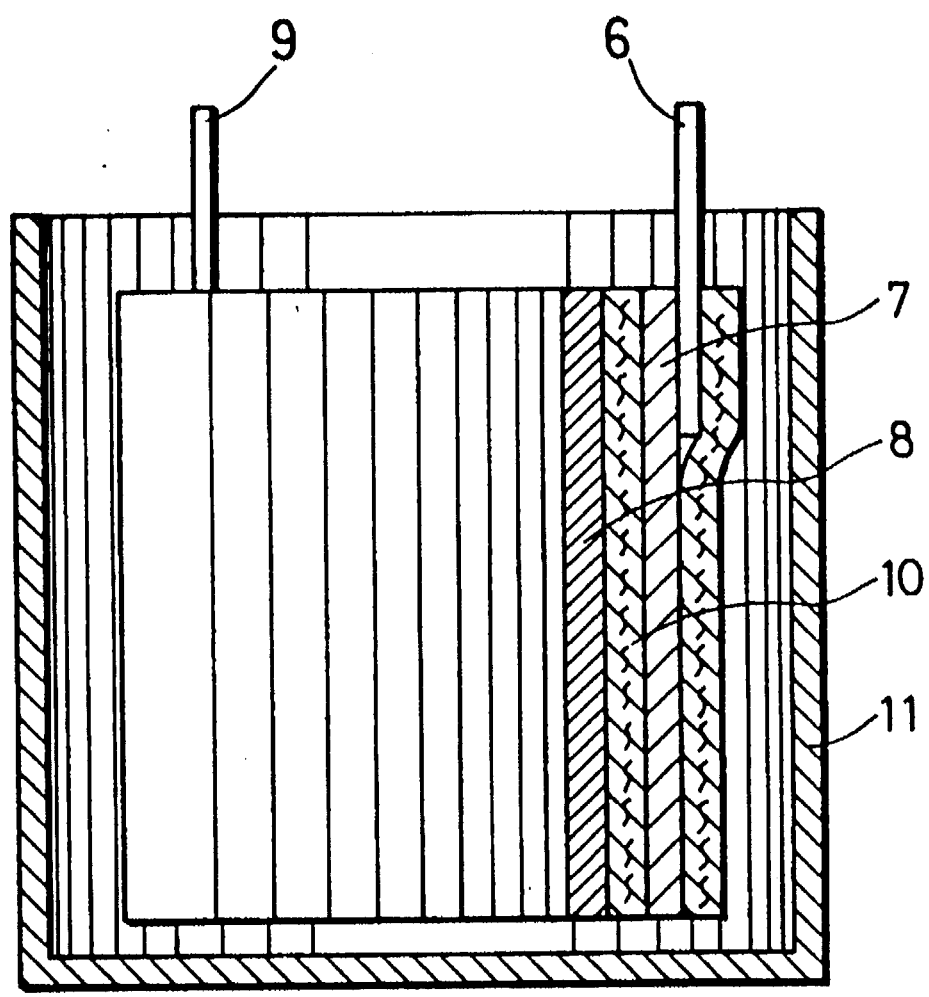
FIG. 4 is a front view of a part cross-section showing an aluminum electrolytic capacitor element in accordance with another embodiment of the present invention.

FIG. 4 shows a configuration of the aluminum electrolytic capacitor of this example. On an electrode made of an aluminum foil of 3 cm×100 cm in size and 0.05 mm in thickness, with a multiplicity of etched pores each having a diameter ranging from about 1 to 5 microns, a positive electrode connector 6 was spot-welded. Next, the aluminum foil was anodized by soaking it in an aqueous solution of boric acid/sodium borate (80 g of boric acid+8 g of sodium borate/1000 ml of water) kept at 90° C. and by flowing a current of 30 A for 15 minutes and then applying a voltage of 600 V for five hours, to obtain a positive electrode 7.

Separate from this, a negative electrode 8 was prepared by spot-welding a negative electrode connector 9 on an electrode 8 made of an aluminum foil of 3 cm×100 cm in size and 0.05 mm in thickness, with a multiplicity of etched pores each having a diameter ranging from about 1 to 5 microns. A capacitor electrode element was prepared by rolling-up the above-mentioned positive electrode foil 7 and the negative electrode foil 8, together with a separator 10 made of Manila hemp having a thickness of 40 μm and a density of 0.20 g/ml in a spiral arrangement.

Next, a base liquid for the polymer electrolyte was prepared by adding 50 g of the prepolymer identical with that of Sample No. 6–5 in Example 6 and 20 g of ammonium diphenylacetate to a solution composed of 20 g of ethylene glycol and 60 g of tetraethyleneglycol monomethylether, and by stirring the whole to make the composition sufficiently homogeneous.

Subsequently, the above-mentioned capacitor electrode element was placed in a cylindrical vessel 11 made of aluminum, into which the above-mentioned base liquid composition for the polymer electrolyte was then injected. Thereafter, the pressure inside the vessel was reduced to 10 mmHg for 20 seconds, and then the above-mentioned base liquid composition for the polymer electrolyte was cured by keeping it in air at 50° C. for 24 hours. Finally, an aluminum electrolytic capacitor C was produced by aging the element by applying a voltage of 450 V at a temperature of 80° C. for 2 hours.

Figure 5:
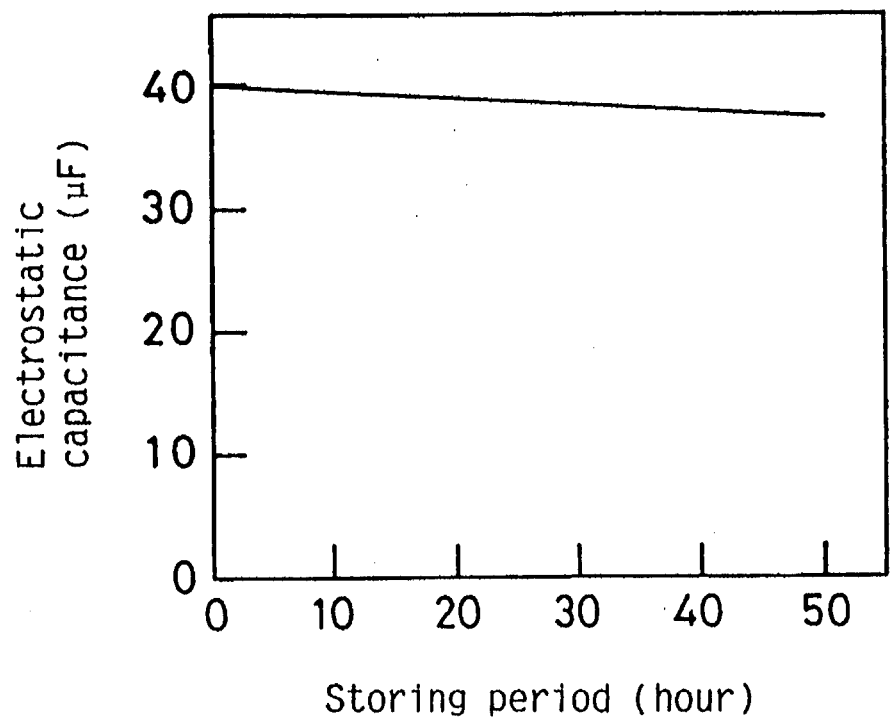
FIG. 5 is a diagram showing change in the electrostatic capacitance of the capacitor element of the embodiment shown by FIG. 4 during storing.
Figure 6:
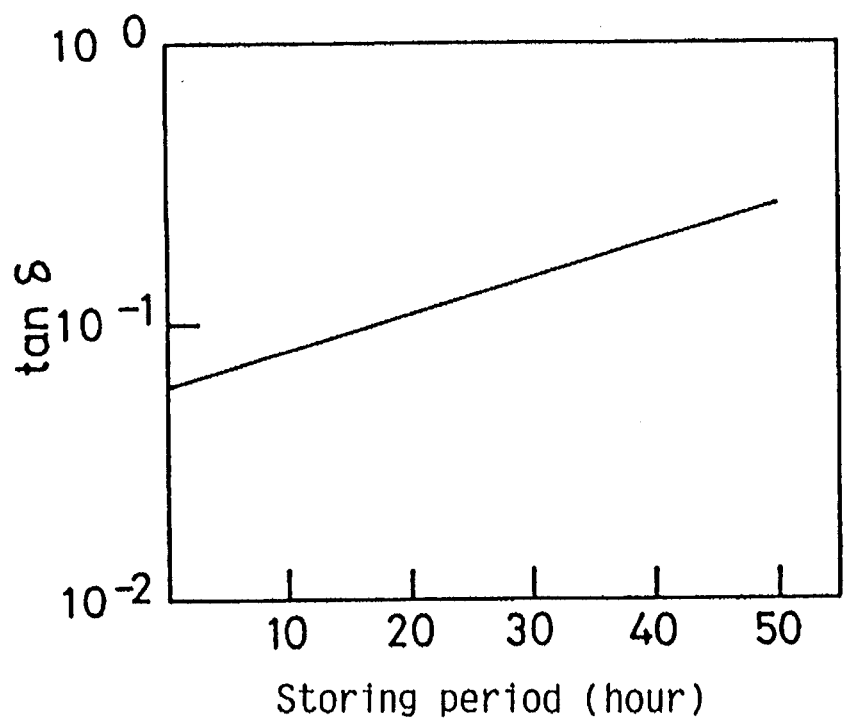
FIG. 6 is a diagram showing change in the tan δ of the capacitor element of the embodiment shown by FIG. 4 during storing.

As an accelerated test for evaluating the stability of the electrolyte in the aluminum electrolytic capacitor element C during its storing at a high temperature, measurements on the electrostatic capacitance and tanδ (loss angle), as well as their changes by aging during their storing at 125° C. in a non-sealed state were performed. The results thereof are shown in FIG. 5 and FIG. 6, respectively. The above measurements were performed at 30° C. at 120 Hz.

As clearly shown in these figures, it is appreciated that the capacitor element C of this example has a sufficient reliability in its stability.

Besides, although the prepolymer whose terminal group X is isocyanate group was employed in this example, a similar technical advantage can be obtained with the one substituted with an epoxy group.

It is understood that various other modifications will be apparent to and can be readily made by those skilled in the art to which this invention pertains without departing from the scope and spirit of this invention. Accordingly, it is not intended that the scope of the claims appended hereto be limited to the description as set forth herein, but rather that the claims be construed as encompassing all the features that would be treated as equivalents thereof, by those skilled in the art to which this invention pertains.

What is claimed is:

1. An ion-conductive polymer electrolyte comprising:
   at least one compound selected from the group consisting of an adduct composed of sorbitol and polyethylene oxide and represented by the general formula

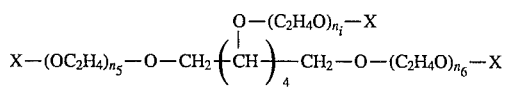

wherein each of $n_i$, $n_5$ and $n_6$ is an integer of 1 or larger, i=1,2,3,4 and X is a group selected from the group consisting of acryloyl, methacryloyl, isocyanate and epoxy and an adduct composed of tetramethylol methane and polyethylene oxide and represented by the general formula

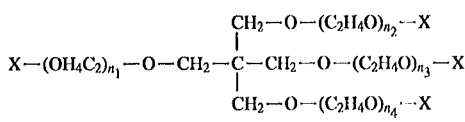

wherein each of $n_1$, $n_2$, $n_3$ and $n_4$ is an integer of 1 or larger, and X is a group selected from the group consisting of acryloyl, methacryloyl, isocyanate and epoxy, at least one ammonium salt or morpholinium salt, and at least one organic solvent.

2. The ion-conductive polymer electrolyte in accordance with claim 1, wherein each of $n_1$, $n_2$, $n_3$, $n_4$, $n_5$ and $n_6$ is 6 to 15.

3. The ion-conductive polymer electrolyte in accordance with claim 1, wherein each of said adducts is cross-linked at its terminal group X.

4. The ion-conductive polymer electrolyte in accordance with claim 2, wherein each of said adducts is cross-linked at its terminal group X.

5. An electrolytic capacitor including:

an aluminum positive electrode having a dielectric substance layer composed of aluminum oxide, an aluminum negative electrode, and an ion-conductive polymer electrolyte layer placed between said dielectric substance layer and said negative electrode, wherein said electrolyte comprising:

at least one compound selected from the group consisting of an adduct composed of sorbitol and polyethylene oxide and represented by the general formula

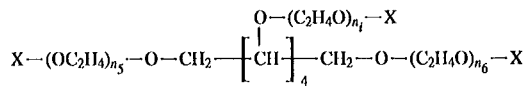

wherein each of $n_i$, $n_5$ and $n_6$ is an integer of 1 or larger, i=1,2,3,4 and X is a group selected from the group consisting of acryloyl, methacryloyl, isocyanate and epoxy and an adduct composed of tetramethylol methane and polyethylene oxide and represented by the general formula

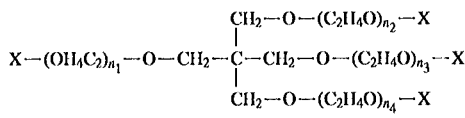

wherein each of $n_1$, $n_2$, $n_3$ and $n_4$ is an integer of 1 or larger, and X is a group selected from the group consisting of acryloyl, methacryloyl, isocyanate and epoxy, at least one ammonium salt or morpholinium salt, and at least one organic solvent.

* * * * *